US012590227B2

(12) United States Patent
Hu

(10) Patent No.: US 12,590,227 B2
(45) Date of Patent: Mar. 31, 2026

(54) ADHESIVE PAPER AND ELECTROCHEMICAL APPARATUS AND ELECTRONIC APPARATUS CONTAINING SUCH ADHESIVE PAPER

(71) Applicant: Ningde Amperex Technology Limited, Ningde (CN)

(72) Inventor: Kewen Hu, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 64 days.

(21) Appl. No.: 18/615,070

(22) Filed: Mar. 25, 2024

(65) Prior Publication Data

US 2024/0263043 A1 Aug. 8, 2024

Related U.S. Application Data

(63) Continuation of application No. PCT/CN2021/120726, filed on Sep. 26, 2021.

(51) Int. Cl.
*C09J 7/21* (2018.01)
*C09J 7/40* (2018.01)
(Continued)

(52) U.S. Cl.
CPC .................. *C09J 7/21* (2018.01); *C09J 7/403* (2018.01); *C09J 123/06* (2013.01); *C09J 123/12* (2013.01);
(Continued)

(58) Field of Classification Search
CPC ........ C08L 51/06; C08L 53/025; Y02E 60/10; H01M 10/4285; H01M 50/536;
(Continued)

(56) References Cited

U.S. PATENT DOCUMENTS

2004/0045597 A1 3/2004 Kimijima et al.
2024/0263043 A1* 8/2024 Hu ............................. C09J 7/21

FOREIGN PATENT DOCUMENTS

CN 102382588 A 3/2012
CN 104342055 A 2/2015
(Continued)

OTHER PUBLICATIONS

International Search Report issued on Jun. 24, 2022, in corresponding International Patent Application No. PCT/CN2021/120726, 5 pages.
(Continued)

*Primary Examiner* — Sonya M Sengupta
(74) *Attorney, Agent, or Firm* — Maier & Maier, PLLC

(57) ABSTRACT

An adhesive paper includes an adhesive layer and a substrate layer. The adhesive layer includes polyolefin and/or modified polyolefin. Dissolved substance of the adhesive paper in a lithium salt-free electrolyte, as tested by cyclic voltammetry, shows zero reaction peaks at a scanning voltage of 4.5 V and an oxidation peak intensity less than $1\times10^{-7}$ A at a scanning voltage from 3 V to 4.5 V. The adhesive paper provided in this application has good electrolyte resistance, high adhesion force, and low swelling degree, thereby contributing to improved safety performance and prolonged service life of the electrochemical apparatus.

20 Claims, 2 Drawing Sheets

(51) Int. Cl.
    *C09J 123/06*      (2006.01)
    *C09J 123/12*      (2006.01)
    *C09J 123/26*      (2006.01)

(52) U.S. Cl.
    CPC ....... *C09J 123/26* (2013.01); *C09J 2203/326*
        (2013.01); *C09J 2301/312* (2020.08)

(58) Field of Classification Search
    CPC ...... C09J 123/10; C09J 123/12; C09J 123/26;
        C09J 2203/326; C09J 2203/33; C09J
        2301/312; C09J 2423/04; C09J 2423/10;
        C09J 2451/00; C09J 7/21; C09J 7/30;
        C09J 7/403
    See application file for complete search history.

(56)             References Cited

FOREIGN PATENT DOCUMENTS

| CN | 104610883 | A | 5/2015 |
| CN | 204939378 | U | 1/2016 |
| CN | 106010391 | A | 10/2016 |
| CN | 109888161 | A | 6/2019 |
| CN | 110511703 | A | 11/2019 |
| CN | 112457789 | A | 3/2021 |
| CN | 112768844 | A | 5/2021 |
| EP | 2983228 | B1 | 11/2017 |
| JP | 2004051884 | A | 2/2004 |
| JP | 2018048266 | A | 3/2018 |
| JP | WO2018186463 | A1 | 2/2020 |
| JP | 2020184522 | A | 11/2020 |
| WO | 2020218362 | A1 | 10/2020 |
| WO | 2023039820 | A1 | 3/2023 |

OTHER PUBLICATIONS

Extended Search Report issued on Mar. 26, 2025, in corresponding European Application No. 21957981.0, 8 pages.

Office Action issued on Apr. 9, 2024, in corresponding Chinese Application No. 202180025456.1, 14 pages.

* cited by examiner

ADHESIVE PAPER AND ELECTROCHEMICAL APPARATUS AND ELECTRONIC APPARATUS CONTAINING SUCH ADHESIVE PAPER

CROSS REFERENCE TO THE RELATED APPLICATIONS

This application is a continuation under 35 U.S.C. § 120 of international patent application PCT/CN2021/120726 filed on Sep. 26, 2021, the entire content of which is incorporated herein by reference.

TECHNICAL FIELD

This application relates to the electrochemical field, and specifically, to an adhesive paper, and an electrochemical apparatus and electronic apparatus containing such adhesive paper.

BACKGROUND

In the manufacturing process of lithium-ion batteries, adhesive paper is required for insulation protection and fixing of the lithium-ion batteries. Currently, specialized adhesive paper for lithium-ion batteries is generally made with polyethylene terephthalate (PET) as the substrate and polyacrylate as the adhesive layer. However, due to the poor electrolyte resistance of polyacrylate, its adhesion force becomes weak after soaking in the electrolyte. When used as protection adhesive for the tab, it cannot effectively bind the tab, causing adhesive paper displacement to tend to occur in the welding region between the tab and the electrode plate, making the welding region prone to tearing. In addition, when polyacrylate is used as a tail-end adhesive for the lithium-ion battery, its own swelling bulge is likely to lead to a poor battery appearance, and this phenomenon becomes more pronounced with the increase in voltage, affecting safety performance of the lithium-ion battery.

SUMMARY

This application provides an adhesive paper, and an electrochemical apparatus and electronic apparatus containing such adhesive paper to improve the safety of the electrochemical apparatus.

It should be noted that in the content of this application, a lithium-ion battery is used as an example of an electrochemical apparatus to explain this application. However, the electrochemical apparatus of this application is not limited to the lithium-ion battery. Specific technical solutions are as follows:

A first aspect of this application provides an adhesive paper, including a substrate layer and an adhesive layer provided on one surface of the substrate layer, the adhesive layer including polyolefin and/or modified polyolefin, where dissolved substance of the adhesive paper in a lithium salt-free electrolyte, as tested by cyclic voltammetry, shows zero reaction peaks at a scanning voltage of 4.5 V and an oxidation peak intensity less than $1\times10^{-7}$ A at a scanning voltage from 3 V to 4.5 V.

The lithium salt-free electrolyte includes a mixed solvent of ethylene carbonate, propylene carbonate, diethyl carbonate, and ethyl propionate at a mass ratio of 3:1:3:3.

Without being bound by any theory, when the adhesive layer includes polyolefin and/or modified polyolefin, and dissolved substance of the adhesive paper in a lithium salt-free electrolyte, as tested by cyclic voltammetry, shows zero reaction peaks at a scanning voltage of 4.5 V and an oxidation peak intensity less than $1\times10^{-7}$ A at a scanning voltage from 3 V to 4.5 V, the obtained adhesive paper has improved electrolyte resistance and adhesion force and reduced swelling degree. After the adhesive paper is soaked in the lithium salt-free electrolyte, dissolved substance in the lithium salt-free electrolyte is tested and shows zero reaction peaks at a scanning voltage of 4.5 V, which indicates that the adhesive paper is suitable for a high-voltage system. The dissolved substance shows an oxidation peak intensity less than $1\times10^{-7}$ A at a scanning voltage from 3 V to 4.5 V, which indicates that the adhesive paper has high electrochemical stability in the lithium salt-free electrolyte and has no electrochemical risk. In other words, the obtained adhesive paper has good electrolyte resistance, high adhesion force, and low swelling degree. Specifically, after soaking in the lithium salt-free electrolyte, the adhesive paper can still effectively bind a tab. This ensures that a welding region between the tab and the electrode plate is less likely to experience positional displacement and the welding region is not prone to tearing. Furthermore, after long-time soaking in the lithium salt-free electrolyte at a high temperature, the adhesive paper exhibits minimal thickness variation. This ensures that the electrochemical apparatus has no bulge in its appearance even after storage at a high temperature, which is conducive to enhancing the safety performance and prolonging the service life of the electrochemical apparatus. In this application, when the adhesive layer is in contact with the electrolyte, forces are exerted by the electrolyte molecules on the adhesive layer molecules, where these forces are greater than cohesive forces between the adhesive layer molecules, such that the adhesive layer molecules are separated from each other and dissolve in the electrolyte, which are referred to as the dissolved substance. For example, the dissolved substance may include but is not limited to small molecules, oligomers, or short C—C chains. The foregoing high temperature refers to a temperature greater than or equal to 40° C.

In some embodiments of this application, the polyolefin includes polyethylene and/or polypropylene, and the modified polyolefin includes maleic anhydride modified polyethylene and/or maleic anhydride modified polypropylene. Without being bound by any theory, selecting the foregoing polyolefin and modified polyolefin is conducive to improving the electrolyte resistance of the adhesive paper, thereby improving the safety performance of the electrochemical apparatus.

In some embodiments of this application, the polyolefin and/or the modified polyolefin has a weight-average molecular weight of 50000 to 400000. For example, the weight-average molecular weight of the polyolefin and/or the modified polyolefin may be 50000, 100000, 150000, 200000, 250000, 300000, 350000, 400000, or in a range defined by any two of these values. Without being bound by any theory, regulating the molecular weights of the polyolefin and the modified polyolefin within the foregoing range is conducive to improving the adhesion force of the adhesive paper, thereby improving the safety performance of the electrochemical apparatus.

In some embodiments of this application, based on a mass of the adhesive layer, the polyolefin and/or the modified polyolefin has a mass percentage of 45% to 85%. For example, the mass percentage of the polyolefin and/or the modified polyolefin may be 45%, 50%, 60%, 70%, 80%, 85%, or in a range defined by any two of these values. Without being bound by any theory, when the mass percentage of the polyolefin and/or the modified polyolefin is too low (for example, lower than 45%), the improvement in the electrolyte resistance, adhesion force, and swelling degree performance of the adhesive paper is insignificant, thus resulting in insignificant improvement effect on the safety performance and service life of the electrochemical apparatus. When the mass percentage of the polyolefin and/or the modified polyolefin is too high (for example, higher than 85%), it may cause the adhesive layer to become less flexible and a waste of the polyolefin and/or the modified polyolefin, resulting in an increase in the cost of the electrochemical apparatus. Selecting the foregoing polyolefin and/or modified polyolefin and regulating the mass percentage thereof in the foregoing range are conducive to improving the electrolyte resistance, and adhesion force, and reducing swelling degree of the adhesive paper, thereby improving the safety performance and prolonging the service life of the electrochemical apparatus, and helping to control the cost.

In some embodiments of this application, the adhesive layer may further include a thermoplastic elastomer, where thermoplastic elastomer includes at least one of styrene-ethylene-butethobyrene-styrene block copolymer, polyurethane, polyolefin, or polyamide. Preferably, the polyolefin includes polyisobutylene and/or polybutadiene. Based on the mass of the adhesive layer, the thermoplastic elastomer has a mass percentage of 10% to 35%. For example, the mass percentage of the thermoplastic elastomer may be 10%, 15%, 20%, 25%, 30%, 35%, or in a range defined by any two of these values. Without being bound by any theory, the thermoplastic elastomer refers to a polymer material that exhibits rubber elasticity at room temperature and can be plasticized and molded at high temperatures. It can ensure the adhesion force of the adhesive paper, while further improving the electrolyte resistance of the adhesive paper. When the mass percentage of the thermoplastic elastomer added is too low (for example, lower than 10%), the improvement in the performance of the adhesive paper is insignificant; and when the mass percentage of the thermoplastic elastomer added is too high (for example, higher than 35%), the mass percentage of the polyolefin and/or the modified polyolefin decreases, leading to a decrease in the electrolyte resistance and adhesion force of the adhesive paper. Selecting the foregoing thermoplastic elastomer and regulating the mass percentage thereof in the foregoing range are conducive to improving the electrolyte resistance and adhesion force of the adhesive paper, thereby improving the safety performance and prolonging the service life of the electrochemical apparatus.

In some embodiments of this application, the adhesive layer may further include a petroleum resin, the petroleum resin including at least one of aliphatic resin (C5), aromatic resin (C9), or aliphatic/aromatic copolymer resin (C5/C9). Based on the mass of the adhesive layer, the petroleum resin has a mass percentage of 2% to 5%. For example, the mass percentage of the petroleum resin may be 2%, 2.5%, 3%, 3.5%, 4%, 4.5%, 5%, or in a range defined by any two of these values. Without being bound by any theory, the petroleum resin provided in this application has a high glass transition temperature. Selecting the foregoing petroleum resin and regulating the mass percentage thereof in the foregoing range can improve the adhesion force of the adhesive paper, thereby contributing to prolonging the service life of the electrochemical apparatus. The weight-average molecular weight of the petroleum resin is not particularly limited in this application, provided that the objectives of this application can be achieved. For example, the weight-average molecular weight is 500 to 10000.

In some embodiments of this application, the adhesive layer may further include a filler, the filler including at least one of titanium pink powder, talc powder, white carbon black, or calcium carbonate. Based on the mass of the adhesive layer, the filler has a mass percentage of 2% to 5%. For example, the mass percentage of the filler may be 2%, 2.5%, 3%, 3.5%, 4%, 4.5%, 5%, or in a range defined by any two of these values. Without being bound by any theory, selecting the foregoing filler and regulating the mass percentage thereof in the foregoing range are conducive to improving the electrolyte resistance of the adhesive paper, thereby improving the safety performance and prolonging the service life of the electrochemical apparatus.

In some embodiments of this application, the adhesive layer may further include an antioxidant, the antioxidant including at least one of diphenylamine, phosphite triester, or dioctadecylthiodipropionate. Based on the mass of the adhesive layer, the antioxidant has a mass percentage of 2% to 5%. For example, the mass percentage of the antioxidant may be 2%, 2.5%, 3%, 3.5%, 4%, 4.5%, 5%, or in a range defined by any two of these values. Without being bound by any theory, selecting the foregoing antioxidant and regulating the mass percentage thereof in the foregoing range are conducive to improving the electrolyte resistance of the adhesive paper, thereby improving the safety performance and prolonging the service life of the electrochemical apparatus.

In some embodiments of this application, the adhesive layer has a thickness of 4 μm to 20 μm, preferably 8 μm to 15 μm. For example, the thickness of the adhesive layer is 4 μm, 5 μm, 8 μm, 10 μm, 12 μm, 15 μm, 18 μm, 20 μm, or in a range defined by any two of these values. Without being bound by any theory, when the thickness of the adhesive layer is too small (for example, less than 4 μm), performance changes are more likely to occur during long-time contact with the electrolyte, affecting the performance of the adhesive paper and, consequently, the service life of the electrochemical apparatus. With the increase in the thickness of the adhesive layer, the adhesion force of the adhesive layer tends to gradually increase. However, the impact of thickness on the adhesion force is limited. When the thickness of the adhesive layer is too large (for example, greater than 20 μm), the adhesion force of the adhesive layer tends to remain constant, but it may lead to a decrease in the energy density of the electrochemical apparatus. Regulating the thickness of the adhesive layer within the foregoing range is conducive to prolonging the service life and increasing the energy density of the electrochemical apparatus.

In some embodiments of this application, the adhesive layer has an adhesion force of 0.2 N/mm to 1 N/mm after hot pressing. In other words, the adhesive paper provided in this application has a high adhesion force, which is conducive to prolonging the service life of the electrochemical apparatus. For example, the adhesion force after hot pressing is 0.2 N/mm, 0.3 N/mm, 0.4 N/mm, 0.5 N/mm, 0.8 N/mm, 1 N/mm, or in a range defined by any two of these values. In this application, hot pressing refers to hot pressing treatment for 10 min to 120 min at a temperature of 60° C. to 100° C. and a pressure of 0.3 MPa to 2 MPa.

In some embodiments of this application, the adhesive layer has an adhesion force of 0.1 N/mm to 1 N/mm after soaking in an 85° C. electrolyte for 4 h. In other words, the adhesive paper provided in this application has good electrolyte resistance at high temperatures, thereby conducive to improving the safety performance and prolonging the service life of the electrochemical apparatus. For example, the adhesion force of the adhesive paper after hot pressing and soaking in the 85° C. electrolyte for 4 h may be 0.1 N/mm, 0.2 N/mm, 0.3 N/mm, 0.4 N/mm, 0.5 N/mm, 0.8 N/mm, 1 N/mm, or in a range defined by any two of these values. The adhesion force test of the adhesive paper after soaking in the 85° C. electrolytic for 4 h is performed in this sequence: hot pressing the adhesive paper, soaking the adhesive paper into the electrolytic, and testing the adhesion force.

In some embodiments of this application, thickness A of the adhesive paper after soaking in an 85° C. electrolyte for 24 h and thickness B of the adhesive paper without soaking in the electrolyte satisfy: 0 μm<A−B≤2 μm. In other words, the adhesive paper provided in this application has a low swelling degree, which is conducive to improving the safety performance and prolonging the service life of the electrochemical apparatus. For example, the value of A−B may be 0 μm, 0.5 μm, 1 μm, 1.5 μm, 2 μm, or in a range defined by any two of these values.

In some embodiments of this application, turbidity D of the electrolyte after the adhesive paper is soaked in an 85° C. electrolyte for 12 h and turbidity E of the electrolyte before the soaking satisfy: 100C<D−E≤1535C when compared by using the Pantone (Pantone) international standard color card. In other words, the adhesive paper provided in this application has good electrolyte resistance, which is conducive to improving the safety performance and prolonging the service life of the electrochemical apparatus.

In some embodiments of this application, the adhesive paper has a maximum adhesive overflow width of 0 mm to 1 mm. In other words, the adhesive paper provided in this application has good thermal stability, which is conducive to improving the safety performance of the electrochemical apparatus. For example, the maximum adhesive overflow width of the adhesive paper may be 0 mm, 0.1 mm, 0.2 mm, 0.3 mm, 0.4 mm, 0.5 mm, 0.6 mm, 0.7 mm, 0.8 mm, 0.9 mm, 1 mm, or in a range defined by any two of these values. In this application, the maximum adhesive overflow width of the adhesive paper refers to a difference between the maximum width of the adhesive paper, after the adhesive paper is hot pressed at a temperature of 85° C. and a pressure of 1 MPa to 2 MPa for 1 h, and the width of the adhesive paper without the hot pressing treatment.

In some embodiments of this application, the substrate layer includes at least one of polyethylene terephthalate, polyimide, or polypropylene, and the substrate layer has a thickness of 4 μm to 40 μm. For example, the thickness of the substrate layer may be 4 μm, 5 μm, 10 μm, 12 μm, 20 μm, 25 μm, 30 μm, 35 μm, 40 μm, or in a range defined by any two of these values. When the thickness of the substrate layer is too small (for example, less than 4 μm), its supporting effect on the adhesive layer is weak, and its insulation protection and fixing effect on the lithium-ion battery decreases. When the thickness of the substrate layer is too large (for example, greater than 40 μm), the action effects are similar to the action effects in the embodiments within the preferred range, but the energy density of the electrochemical apparatus decreases. Without being bound by any theory, selecting the foregoing substrate layer materials and regulating the thickness of the substrate layer in the foregoing range are conducive to improving the electrolyte resistance of the adhesive paper and thereby conducive to improving the safety performance and prolonging the service life of the electrochemical apparatus.

In some embodiments of this application, the adhesive paper has a thickness of 8 μm to 60 μm, preferably 12 μm to 40 μm. In this application, the thickness of the adhesive paper is a sum of the thickness of the adhesive layer and the thickness of the substrate layer.

In some embodiments of this application, the adhesive paper further includes a release paper and the release paper is provided on a surface of the adhesive layer facing away from the substrate layer. The release paper in the adhesive paper is provided for preventing the surface of the adhesive layer from coming into contact with a non-adhering target surface or itself, so as to avoid adhesion of the adhesive layer to the non-adhering target surface or itself during use of the adhesive paper. Persons skilled in the art may select any suitable material or size for the release paper in the art according to the actual needs. In some embodiments, the release paper may be provided one-sided on any exposed surface of the adhesive layer, for example, but not limited to, a surface of the adhesive layer facing away from the substrate layer or a surface on a side of the adhesive layer. In some embodiments, the release paper is removed before the adhesive layer in the adhesive paper is adhered to a target surface. In some embodiments, the release paper includes a single-sided silicone release film or a double-sided silicone release film.

Preparation methods of the adhesive paper are not particularly limited in this application, provided that the objectives of this application can be achieved. For example, this application may adopt the following method for preparing the adhesive paper, including the following steps: mixing the raw materials of the adhesive layer at a certain proportion to obtain the adhesive layer slurry, and then applying the adhesive layer slurry on the substrate layer using a coating machine, followed by drying to obtain the adhesive paper. The substrate layer may first be treated with a non-silicone release agent and then the surface may be corona treated. The drying temperature may be from 60° C. to 120° C.

A second aspect of this application provides an electrochemical apparatus including the adhesive paper according to any one of the embodiments of this application. The obtained electrochemical apparatus has good electrolyte resistance and a long service life.

In some embodiments of this application, an electrode plate is further included, where the electrode plate includes a tab, and an adhesion force between the adhesive layer in the adhesive paper and the tab or between the adhesive layer in the adhesive paper and the electrode plate is 0.2 N/mm to 1.0 N/mm, thereby conducive to improving the safety performance and prolonging the service life of the electrochemical apparatus. For example, the adhesion force between the adhesive layer and the tab or between the adhesive paper and the electrode plate may be 0.2 N/mm, 0.3 N/mm, 0.4 N/mm, 0.5 N/mm, 0.8 N/mm, 1 N/mm, or in a range defined by any two of these values. The electrode plate may be a positive electrode plate or a negative electrode plate. In this application, a tab refers to a metal conductor leading from an electrode plate for connecting in series or in parallel to other parts of the electrochemical apparatus. The tab of a positive electrode plate is called a positive electrode tab; and the tab of a negative electrode plate is called a negative electrode tab. The material of the tab is not particularly limited in this application, provided that the objectives of this application can be achieved. For example, a tab material known in the art can be used.

The positive electrode plate in this application is not particularly limited, provided that the objectives of this application can be achieved. For example, the positive electrode plate generally includes a positive electrode current collector and a positive electrode material layer. The positive electrode current collector is not particularly limited, provided that the objectives of this application can be achieved. For example, the positive electrode current collector may include but is not limited to aluminum foil, aluminum alloy foil, or a composite current collector. In this application, thickness of the positive electrode current collector is not particularly limited, provided that the objectives of this application can be achieved. For example, the thickness of the positive electrode current collector is 8 μm to 12 μm.

In this application, the positive electrode material layer includes a positive electrode active material, and the positive electrode active material is not particularly limited, provided that the objectives of this application can be achieved. For example, the positive electrode active material may include at least one of composite oxides of lithium and transition metal elements. The foregoing transition metal element is not particularly limited in this application, provided that the objectives of this application can be achieved. For example, the transition metal element may include at least one of nickel, manganese, cobalt, or iron. Specifically, the positive electrode active material may include at least one of nickel cobalt lithium manganate (811, 622, 523, 111), lithium nickel cobalt aluminate, lithium iron phosphate, lithium-rich manganese-based materials, lithium cobalt oxide, lithium manganate, lithium iron manganese phosphate, or lithium titanate.

In this application, the positive electrode material layer may further include a conductive agent. The conductive agent is not particularly limited in this application, provided that the objectives of this application can be achieved. For example, the conductive agent may include but is not limited to at least one of conductive carbon black (Super P), carbon nanotubes (CNTs), carbon fiber, flake graphite, Ketjen black, graphene, a metal material, or a conductive polymer. The foregoing carbon nanotubes may include but are not limited to single-walled carbon nanotubes and/or multi-walled carbon nanotubes. The foregoing carbon fiber may include but is not limited to vapor grown carbon fiber (VGCF) and/or carbon nanofiber. The foregoing metal material may include but is not limited to metal powder and/or metal fiber. Specifically, the metal may include but is not limited to at least one of copper, nickel, aluminum, or silver. The foregoing conductive polymer may include but is not limited to at least one of polyphenylene derivative, polyaniline, polythiophene, polyacetylene, or polypyrrole.

The positive electrode material layer in this application may further include a binder. The binder is not particularly limited in this application, provided that the objectives of this application can be achieved. For example, the binder may include but is not limited to at least one of polyacrylic acid, sodium polyacrylate, potassium polyacrylate, lithium polyacrylate, polyimide, polyvinyl alcohol, carboxymethyl cellulose, sodium carboxymethyl cellulose, lithium carboxymethyl cellulose, polyamideimide, styrene-butadiene rubber, or polyvinylidene fluoride.

Optionally, the positive electrode plate may further include a conductive layer, and the conductive layer is sandwiched between the positive electrode current collector and the positive electrode material layer. Composition of the conductive layer is not particularly limited in this application, and the conductive layer may be a conductive layer commonly used in the art. For example, the conductive layer may include but is not limited to the foregoing conductive agent and the foregoing binder.

The negative electrode plate in this application is not particularly limited, provided that the objectives of this application can be achieved. For example, the negative electrode plate generally includes a negative electrode current collector and a negative electrode material layer. The negative electrode current collector is not particularly limited, provided that the objectives of this application can be achieved. For example, the negative electrode current collector may include but is not limited to copper foil, copper alloy foil, nickel foil, stainless steel foil, titanium foil, foamed nickel, foamed copper, composite current collector, or the like. In this application, thickness of the negative electrode current collector is not particularly limited, provided that the objectives of this application can be achieved. For example, the thickness of the negative electrode current collector is 4 μm to 12 μm.

In this application, the negative electrode material layer includes a negative electrode active material, and the negative electrode active material is not particularly limited, provided that the objectives of this application can be achieved. For example, the negative electrode active material may include but is not limited to at least one of natural graphite, artificial graphite, mesocarbon microbeads, hard carbon, soft carbon, silicon, a silicon-carbon composite, Li—Sn alloy, Li—Sn—O alloy, Sn, SnO, $SnO_2$, spinel-structured lithiated $TiO_2$—$Li_4Ti_5O_{12}$, or Li—Al alloy.

In this application, the negative electrode material layer may further include a conductive agent. The conductive agent is not particularly limited in this application, provided that the objectives of this application can be achieved. For example, the conductive agent may include but is not limited to at least of the foregoing conductive agents.

In this application, the negative electrode material layer may further include a binder. The binder is not particularly limited in this application, provided that the objectives of this application can be achieved. For example, the binder may include but is not limited to at least of the foregoing binders.

Optionally, the negative electrode plate may further include a conductive layer, and the conductive layer is sandwiched between the negative electrode current collector and the negative electrode material layer. Composition of the conductive layer is not particularly limited in this application, and the conductive layer may be a conductive layer commonly used in the art. The conductive layer may include but is not limited to the foregoing conductive agent and the foregoing binder.

The electrochemical apparatus in this application further includes a separator. The separator is not particularly limited in this application, provided that the objectives of this application can be achieved. For example, the separator may include but is not limited to at least one of polyethylene (PE), polypropylene (PP), and polytetrafluoroethylene-based polyolefin (PO) separator, polyester film (for example, polyethylene terephthalate (PET) film), cellulose film, polyimide film (PI), polyamide film (PA), spandex film, aramid film, woven film, non-woven film (non-woven fabric), microporous film, composite film, separator paper, laminated film, or spinning film. The separator in this application may be of a porous structure. A pore size is not particularly limited, provided that the objectives of this application can be achieved. For example, the pore size may be 0.01 μm to 1 μm. Thickness of the separator is not particularly limited in this application, provided that the objectives of this application can be achieved. For example, the thickness of the separator may be 5 μm to 500 μm.

For example, the separator may include a separator substrate layer and a surface treatment layer. The separator substrate layer may be a non-woven fabric, film, or composite film that has a porous structure. The material of the separator substrate layer may include but is not limited to at least one of polyethylene, polypropylene, polyethylene terephthalate, polyimide, and the like. Optionally, a polypropylene porous film, a polyethylene porous film, a polypropylene non-woven fabric, a polyethylene non-woven fabric, or a polypropylene-polyethylene-polypropylene porous composite film may be used. Optionally, the surface treatment layer is provided on at least one surface of the separator substrate layer, and the surface treatment layer may be a polymer layer or an inorganic substance layer, or a layer formed by mixing a polymer and an inorganic substance.

The polymer layer includes a polymer, and a material of the polymer may include but is not limited to at least one of polypropylene, polyamide, polyacrylonitrile, acrylate polymer, polyacrylic acid, polyacrylate salt, polyvinylpyrrolidone, polyvinyl ether, polyvinylidene fluoride, or poly(vinylidene fluoride-hexafluoropropylene). The inorganic substance layer may include but is not limited to an inorganic particle and a binder. The inorganic particle is not particularly limited in this application. For example, the inorganic particle may include but is not limited to at least one of ceramics, aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, or barium sulfate. The inorganic substance layer binder is not particularly limited in this application. For example, the inorganic substance layer binder may include but is not limited to at least one of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, or polyhexafluoropropylene.

The electrochemical apparatus in this application is not particularly limited, and may include any apparatus in which an electrochemical reaction occurs. In some embodiments, the electrochemical apparatus may include but is not limited to a lithium metal secondary battery, a lithium-ion secondary battery (lithium-ion battery), a lithium polymer secondary battery, or a lithium-ion polymer secondary battery.

A process for preparing the electrochemical apparatus is well known to persons skilled in the art, and is not particularly limited in this application. For example, the process may include but is not limited to the following steps: stacking the positive electrode plate, the separator, and the negative electrode plate in sequence, performing operations such as winding and folding on the stack as required to obtain an electrode assembly having a winding structure, placing the electrode assembly into a packaging bag, injecting an electrolyte into the packaging bag and sealing the packaging bag to obtain the electrochemical apparatus; or stacking the positive electrode plate, the separator, and the negative electrode plate in sequence, fixing four corners of the overall laminated structure with a tape to obtain an electrode assembly having a laminated structure, placing the electrode assembly into a packaging bag, injecting an electrolyte into the packaging bag and sealing the packaging bag to obtain the electrochemical apparatus. In addition, if necessary, an overcurrent prevention element, a guide plate, and the like may be placed in the packaging bag to prevent pressure increase, overcharge, and discharge in the electrochemical apparatus.

A third aspect of this application provides an electronic apparatus, including the electrochemical apparatus according to any one of the embodiments of this application.

The electronic apparatus in this application is not particularly limited, and may be any known electronic apparatus used in the prior art. In some embodiments, the electronic apparatus may include but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, and a lithium-ion capacitor.

This application provides an of adhesive paper, including a substrate layer and an adhesive layer provided on one surface of the substrate layer, the adhesive layer including polyolefin and/or modified polyolefin, where dissolved substance of the adhesive paper in a lithium salt-free electrolyte, as tested by cyclic voltammetry, shows zero reaction peaks at a scanning voltage of 4.5 V and an oxidation peak intensity less than $1 \times 10^{-7}$ A at a scanning voltage from 3 V to 4.5 V. In this case, the obtained adhesive paper has improved electrolyte resistance and adhesion force and reduced swelling degree. After soaking in the electrolyte, the adhesive paper provided in this application can still effectively bind a tab. This ensures that the welding region between the tab and the electrode plate is less likely to experience positional displacement and the welding region is not prone to tearing. Furthermore, after long-time soaking in the electrolyte at a high temperature, the adhesive paper exhibits minimal thickness variation. This ensures that the electrochemical apparatus has no bulge in its appearance even after storage at a high temperature, which is conducive to improving the safety performance and prolonging the service life of the electrochemical apparatus.

BRIEF DESCRIPTION OF DRAWINGS

To describe the technical solutions in this application and the prior art more clearly, the following briefly describes the accompanying drawings required for describing the embodiments and the prior art. Apparently, the accompanying drawings in the following description show merely some embodiments of this application.

REFERENCE SIGNS 10. positive electrode plate; 11. positive electrode tab; 12. adhesive paper; 20. negative electrode plate; and 30. separator.

DETAILED DESCRIPTION

To make the objectives, technical solutions, and advantages of this application more comprehensible, the following describes this application in detail with reference to accompanying drawings and embodiments. Apparently, the described embodiments are merely some rather than all of the embodiments of this application. All other technical solutions obtained by persons of ordinary skill in the art based on the embodiments of this application shall fall within the protection scope of this application.

Figure 1:
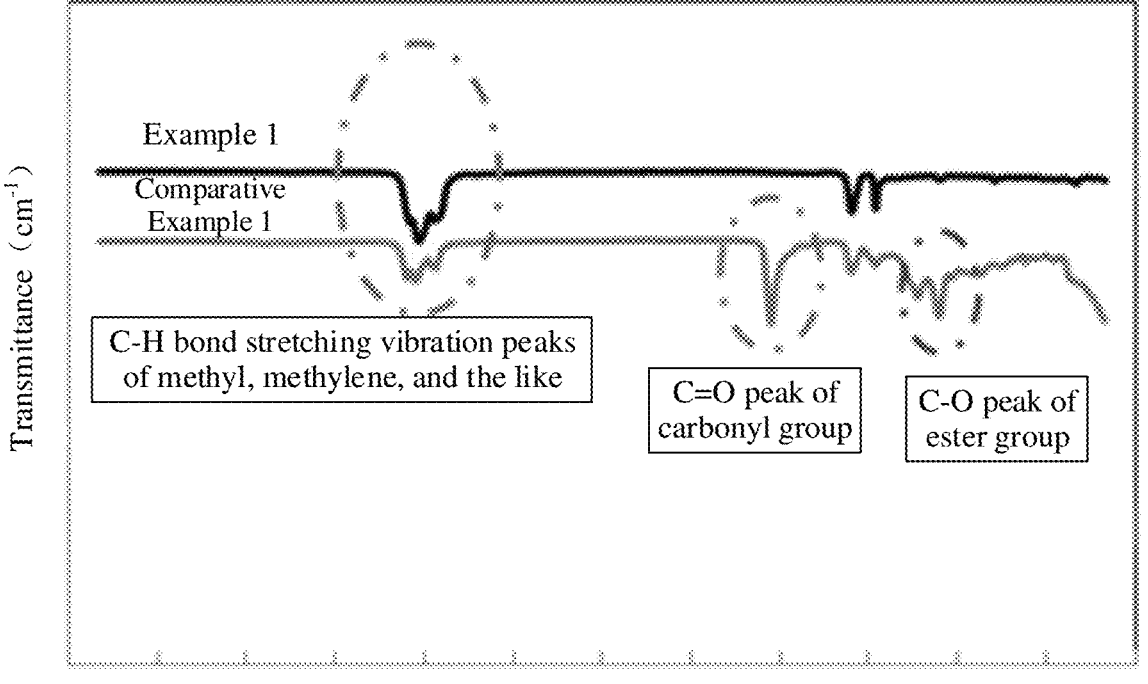
FIG. 1 is a curve chart of Fourier transform infrared absorption spectra of adhesive papers in Example 1 and Comparative Example 1.

FIG. 1 is a curve chart of Fourier transform infrared absorption spectra of adhesive papers in Example 1 and Comparative Example 1. As can be seen from the figure, the absorption peaks corresponding to the carbonyl group and the ester group on the surface of the adhesive paper in Example 1 have basically disappeared, while the carbonyl group and the ester group are still present on the surface of the adhesive paper in Comparative Example 1. This indicates that the adhesive paper provided in this application has a low-swelling property.

Figure 2:
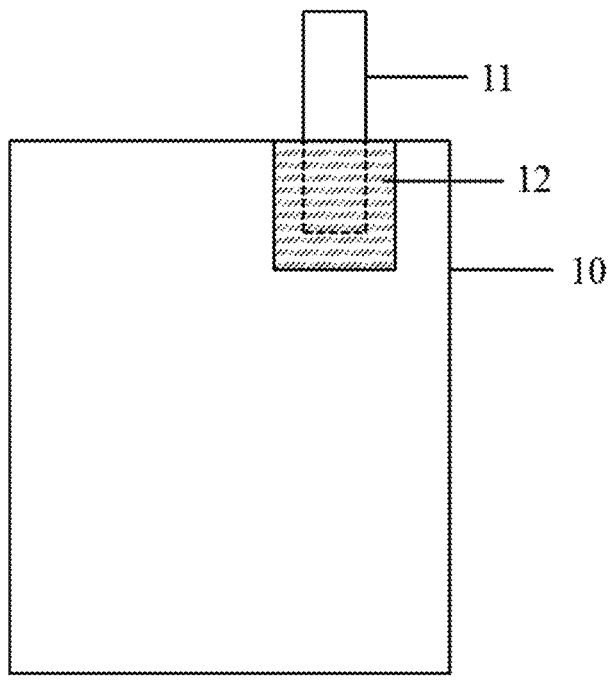
FIG. 2 is a schematic diagram of a positive electrode plate according to some embodiments of this application.

FIG. 2 shows a positive electrode plate according to some embodiments of this application. The positive electrode plate 10 includes a positive electrode tab 11 connected to the positive electrode plate 10, and an adhesive paper 12 is provided at the connection between the positive electrode tab 11 and the positive electrode plate 10.

Specifically, the adhesive paper may be provided at the connection between the positive electrode tab and the positive electrode plate, or at the connection between the negative electrode tab and the negative electrode plate, or simultaneously at the connection between the positive electrode tab and the positive electrode plate and at the connection between the negative electrode tab and the negative electrode plate. The specific position for providing the adhesive paper can be selected according to the actual situation.

Figure 3:
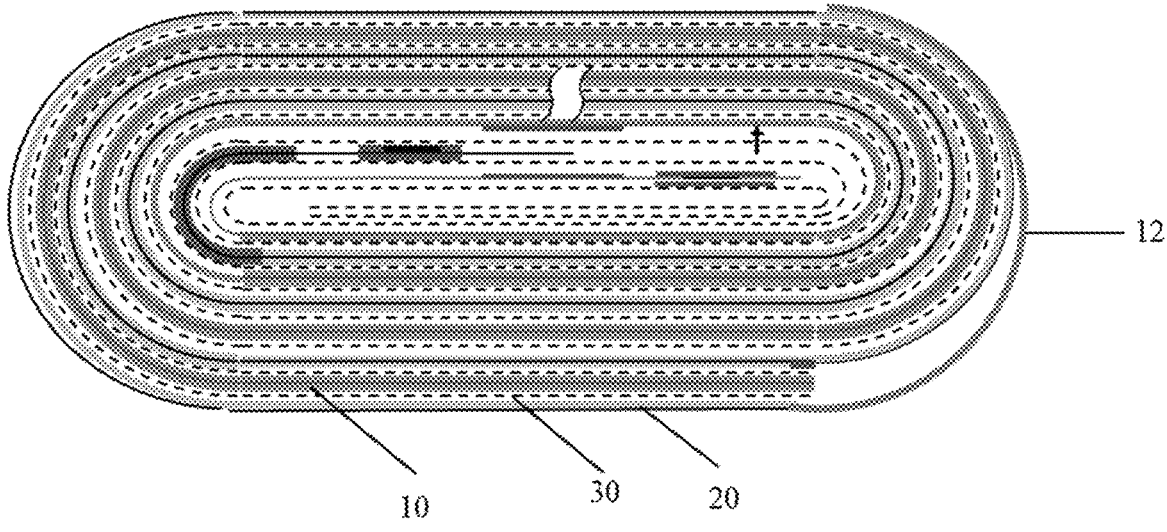
FIG. 3 is a schematic sectional view of an electrochemical apparatus according to some embodiments of this application.

FIG. 3 shows a cross-section of an electrochemical apparatus according to some embodiments of this application. The electrochemical apparatus adopts a winding structure, including a positive electrode plate 10, a negative electrode plate 20, and a separator 30. The adhesive paper 12 is provided at the tail-end region of the negative electrode plate 20.

Specifically, the adhesive paper may be provided in the tail-end region of the positive electrode plate and/or the tail-end region of the negative electrode plate. The adhesive paper may alternatively be provided in the tail-end region of the positive electrode plate and/or the tail-end region of the negative electrode plate, while simultaneously being provided at the connection between the positive electrode tab and the positive electrode plate and/or the connection between the negative electrode tab and the negative electrode plate. The specific position for providing the adhesive paper can be selected according to the actual situation.

It should be noted that in specific embodiments of this application, an example in which a lithium-ion battery is used as an electrochemical apparatus is used to illustrate this application. However, the electrochemical apparatus in this application is not limited to the lithium-ion battery.

EXAMPLES

The following describes the embodiments of this application more specifically by using examples and comparative examples. Various tests and evaluations were performed in the following methods. In addition, unless otherwise specified, "part" and "%" are based on mass.
Test Method and Device
Adhesion Fore Test The adhesive paper was pasted onto an Al foil, cut into a strip sample of 20 mm×60 mm, and processed by hot pressing at a temperature of 85° C. and a pressure of 1 MPa for 40 min. Then, the sample was pasted onto a steel plate (with an adhesion length of not less than 40 mm) using double-sided adhesive tape (Nitto 5000NS), and the steel plate was fixed at the corresponding position on a Gotech tensile machine. Another end of the sample which was not adhered to the steel plate was pulled up, and the sample was put into the grip and clamped securely. The pulled-up part of the sample formed a 180° angle with the steel plate in space. The grip pulled at a speed of 50 mm/min, and the average value of the tensile force in the stable region was finally recorded as the adhesion force after hot pressing.

The adhesive paper was pasted onto an Al foil, cut into a strip sample of 20 mm×60 mm, and processed by hot pressing at a temperature of 85° C. and a pressure of 1 MPa for 40 min, followed by soaking in an 85° C. electrolyte for 4 h. Then, the sample was pasted onto a steel plate (with an adhesion length of not less than 40 mm) using double-sided adhesive tape, and the steel plate was fixed at the corresponding position on a Gotech tensile machine. Another end of the sample which was not adhered to the steel plate was pulled up, and the sample was put into the grip and clamped securely. The pulled-up part of the sample formed a 180° angle with the steel plate in space. The grip pulled at a speed of 50 mm/min, and the average value of the tensile force in the stable region was finally recorded as the adhesion force after soaking in an electrolyte.

The organic solvent of the electrolyte included ethylene carbonate (EC), propylene carbonate (PC), diethyl carbonate (DEC), and ethyl propionate (EP) at a mass ratio of EC:PC:DEC:EP=3:1:3:3, and the solute was lithium hexafluorophosphate ($LiPF_6$), where a concentration of $LiPF_6$ was 1 mol/L.
Adhesive Overflow Test The initial width of the adhesive paper was measured. Then, the adhesive paper was hot-pressed at a temperature of 85° C. and a pressure of 1 MPa to 2 MPa for 1 h, and the maximum width of the adhesive paper was measured and recorded as the adhesive overflow width. For the adhesive paper in each example and comparative example, 10 samples were tested. The maximum adhesive overflow width of the adhesive paper was the average value of the differences between the adhesive overflow widths and the initial widths for the 10 samples.
Swelling Thickness Test The adhesive paper was cut into a strip of 20 mm×60 mm. The initial thickness of the adhesive paper was measured. Then the adhesive paper was pasted onto an Al foil and soaked in an electrolyte for 24 h at a temperature of 85° C. After the soaking, the adhesive paper was taken out and wiped dry. Within 5 min, the thickness of the edge of the adhesive paper was measured using a ten-thousandth micrometer. 10 places were randomly selected for the measurement, and the obtained average value was the swelling thickness of the adhesive paper. For the adhesive paper in each example and comparative example, 10 samples were tested. The swelling thickness variation of the adhesive paper was the average value of the differences between the swelling thicknesses and the initial thicknesses for the 10 samples. The electrolyte was the same as the electrolyte in the foregoing adhesion force test.
Turbidity Test A fixed position in a room was selected and the light source and angle were determined. A sheet of A4 paper was used as the background. The glass sample bottle containing the electrolyte was placed on the A4 paper. The color of the electrolyte was compared with the colors on the Pantone international standard color card and the closest color was selected. After 3 people confirmed the color selected, the color number was recorded as the initial color number. The adhesive paper was pasted onto an Al foil, cut into a strip sample of 20 mm×60 mm, processed by hot pressing at a temperature of 85° C. and a pressure of 1 MPa for 40 min, cooled to room temperature, and placed into the sample bottle for soaking in the 85° C. electrolyte for 12 h. Then, the sample was taken out. Through the same method as above, the color number of the electrolyte was recorded as the color number after soaking. The initial color number and the color number after soaking were compared for consistency. If the color numbers were consistent, it indicated that the turbidity of the electrolyte had not changed much; and if the color numbers were not consistent, it indicated that the turbidity of the electrolyte had changed a lot. The electrolyte was the same as the electrolyte in the foregoing adhesion force test.

Drop Test

The battery made in each example or comparative example was charged at room temperature at a constant current of 0.5C to a full charge voltage; and charged at a constant voltage to a current of 0.05C, so that the battery was in a fully charged state. Then, the voltage of the lithium-ion battery was adjusted to 68% SOC. The voltage and the internal resistance were measured, ensuring that the voltage of the lithium-ion battery was from 3.94 V to 3.99 V. A constant pressure tester and a dedicated metal or plastic mold for drop testing were used. The lithium-ion battery was placed into the constant pressure tester, and the lithium-ion battery was tightly attached. Immediately afterward (within 1 min), the air was compressed. A 5 kg pressure block was used to press the lithium-ion battery for 7 s, and left standing for 1 h. Then, the voltage and the internal resistance were measured again. The appearance of the battery was inspected for damage, electrolyte leakage, swelling, corrosion, and the like. After this was completed, the cover plate of the dedicated metal or plastic mold for drop testing was closed and the screws were tightened to complete the drop test preparation.

According to the following sequence, the battery was dropped freely in 6 directions from a height of 1.8 meters: head→tail→head right corner→tail right corner→head left corner→tail left corner. The angle between the battery and the ground was 45°±15°. The process was repeated for 7 rounds. At the end of each round of test, if any electrolyte leakage, heating, smoking, fire, or voltage reduction exceeding 50 mV was detected, the drop test was stopped. At the end of the drop test, the battery was left standing at room temperature for 24 h and then the voltage and internal resistance were measured. The pass criterion of the drop test was no fire and no electrolyte leakage. Ten batteries were tested for each example or comparative example in which the batteries were made, and the number of batteries that passed the test was recorded.

Tab Welding Tensile Force Test

A Gotech tensile machine was used to tear apart the positive electrode tab and the positive electrode plate (the negative electrode tab and the negative electrode plate) at an angle of 180° and a speed of 60 mm/min, so that the welding regions were separated. The stable tensile force at the time of separation was recorded as the welding tensile force.

High-Temperature Storage Thickness Swelling Rate Test

The battery was placed in a 25° C. thermostat and left standing for 30 min, so that the battery reached a constant temperature. The battery was charged at a constant current of 1C to 4.45 V, then charged at a constant voltage to a current of 0.05C, and then discharged at a constant current of 1C to 2.8 V. The discharge capacity was recorded as the initial capacity of the battery. The battery was then charged at a constant current of 0.5C to 4.45 V, and charged at a constant voltage to a current of 0.05C. A thickness of the battery was measured with a micrometer and recorded as an initial thickness. The battery under test was put into an 85° C. thermostat and stored there for 24 h. After the storage, the thickness of the battery was tested as the hot test storage thickness. Then, the battery was put into a 25° C. thermostat and left standing for 60 min. The thickness of the battery was tested as the cold test storage thickness.

Hot test: Thickness swelling rate for storage at 85° C. for 24 h=(hot test storage thickness−initial thickness)/initial thickness×100%

Test of Dissolved Substance of Adhesive Paper in Electrolyte:

The adhesive paper was pasted onto an Al foil, cut into a strip sample of 20 mm×60 mm, and soaked in an 85° C. lithium salt-free electrolyte for 24 h and then taken out. Then, the cyclic voltammetry (CV) curve of the lithium salt-free electrolyte was tested by using a platinum electrode.

The lithium salt-free electrolyte was obtained by mixing ethylene carbonate (EC), propylene carbonate (PC), diethyl carbonate (DEC), and ethyl propionate (EP) at a mass ratio of 3:1:3:3.

Fourier Transform Infrared Absorption Spectra Test

A Fourier transform infrared absorption spectrometer (manufacturer: Thermo Fisher, USA; model: Nicolet iS50) was used to test the contents of carboxyl and ester groups on the surface of the adhesive paper using the total reflection method and the KRS-5 prism.

Example 1-1

<Preparation of Positive Electrode Plate>

A positive electrode active material lithium nickel manganese cobalt ternary material (NCM613), a conductive agent conductive carbon black (Super P), and a binder polyvinylidene fluoride were mixed at a mass ratio of 97:1.4:1.6, and then added with N-methylpyrrolidone (NMP). The resulting mixture was stirred by using a vacuum stirrer to a uniform transparent system to obtain a positive electrode slurry, where a solid content of the positive electrode slurry was 75%. The positive electrode slurry was evenly applied on one surface of a positive electrode current collector aluminum foil having a thickness of 9 μm, and the aluminum foil was dried at 85° C. to obtain a positive electrode plate having a coating thickness of 110 μm and with one surface coated with the positive electrode material layer. The foregoing steps were repeated on the other surface of the aluminum foil to obtain the positive electrode plate coated with the positive electrode active material on two surfaces. After cold pressing, cutting, and slitting, drying was performed in vacuum at 85° C. for 4 h to obtain a 74 mm×867 mm positive electrode plate. Dv50 of the positive electrode active material was 1 μm, and the positive electrode plate included one positive electrode tab.

<Preparation of Negative Electrode Plate>

A negative electrode active material artificial graphite, a conductive agent Super P, a thickener sodium carboxymethyl cellulose (CMC-Na), and a binder styrene-butadiene rubber (SBR) were mixed at a mass ratio of 96.4:1.5:0.5:1.6, added with deionized water, and stirred by a vacuum stirrer to obtain a negative electrode slurry with a solid content of 70%. The negative electrode slurry was evenly applied on one surface of a negative electrode current collector copper foil having a thickness of 8 μm, and the copper foil was dried at 85° C. to obtain a negative electrode plate having a coating thickness of 130 μm and with one surface coated with the negative electrode material layer. The foregoing steps were repeated on the other surface of the copper foil to obtain the negative electrode plate coated with the negative electrode active material on two surfaces. After cold pressing, cutting, and slitting, drying was performed in vacuum at 120° C. for 12 h to obtain a 74 mm×867 mm negative electrode plate. The negative electrode plate included one negative electrode tab.

<Preparation of Electrolyte>

In a dry argon atmosphere glove box, organic solvents ethylene carbonate (EC), propylene carbonate (PC), diethyl carbonate (DEC), and ethyl propionate (EP) were mixed at a mass ratio of EC:PC:DEC:EP=3:1:3:3, and then a lithium salt $LiPF_6$ was added to the organic solvents for dissolving and mixing to uniformity. A concentration of $LiPF_6$ in the electrolyte was 1 mol/L. According to the Pantone international standard color card, the initial color number E of the electrolyte was obtained as 1225C by comparison.

<Preparation of Separator>

Aqueous polyvinylidene fluoride (PVDF), ceramic, and polypropylene were mixed at a mass ratio of 1:8:1, added to deionized water, and stirred to obtain a coating slurry with a solid content of 50%. The coating slurry was uniformly applied onto one surface of a polyethylene (PE) film (provided by Celgard) with a thickness of 7 μm, and dried at 85° C. to obtain a separator having a coating thickness of 5 μm at one surface. The foregoing steps were repeated on the other surface of the separator to obtain a separator coated with the coating at two surfaces. After drying and cold pressing, the separator was obtained.

<Preparation of Adhesive Paper>

The adhesive paper included an adhesive layer provided on one surface of the substrate layer, where the adhesive paper had a thickness of 25 μm, the adhesive layer had a thickness of 12 μm, and the substrate layer had a thickness of 12 μm.

Polyethylene, thermoplastic elastomer styrene-ethylene-butethobyrene-styrene block copolymer, petroleum resin C5, filler titanium pink powder, and antioxidant diphenylamine were mixed homogeneously at a mass ratio of 60:25:5:5:5, and then applied to the substrate layer to form the adhesive layer, followed by drying at 120° C. to obtain the adhesive paper. The molecular weight of the polyethylene was 225000.

The substrate layer was a polyethylene terephthalate (PET) film.

<Preparation of Lithium-Ion Battery>

20 mm×45 mm adhesive papers were pasted onto the connection between the positive electrode tab and the positive electrode plate and the connection between the negative electrode tab and the negative electrode plate respectively. The positive electrode plate, separator, and negative electrode plate were stacked in sequence, so that the separator was sandwiched between the positive electrode plate and the negative electrode plate for separation. Then the resulting stack was wound to obtain an electrode assembly. The electrode assembly was put into an aluminum-plastic film packaging bag and dried, and then the electrolyte was injected, followed by processes such as vacuum packaging, standing, formation, degassing, and cutting to obtain a lithium-ion battery. The formation condition was charging at a constant current of 0.02C to 3.3 V, then charging at a constant current of 0.1C to 3.6 V, and finally charging at a constant current of 0.2C to 4.45 V.

Example 1-2 to Example 1-7 were the same as Example 1-1 except that the type and mass percentage of component 1 of the adhesive layer were adjusted according to Table 1.

Example 2-1 to Example 2-6 were the same as Example 1-2 except that the weight-average molecular weight of component 1 of the adhesive layer was adjusted according to Table 2.

Example 3-1 to Example 3-16 were the same as Example 1-2 except that the mass percentage of component 1 of the adhesive layer, the composition of component 2 of the adhesive layer, and the mass percentage of each subcomponent of component 2 of the adhesive layer were adjusted according to Table 3.

Example 4-1 to Example 4-12 were the same as Example 1-2 except that the thickness of the adhesive layer, the thickness of the substrate layer, and the material of the substrate layer were adjusted according to Table 4.

Comparative Example 1 was the same as Example 1-1 except that polyethylene was replaced with polyacrylate.

The preparation parameters and performance tests of the examples and comparative examples are shown in Table 1 to Table 4.

TABLE 1

| | Component 1 of adhesive layer | Mass percentage of component 1 of adhesive layer (%) | Oxidation peak intensity Y ×10⁻⁷ (A) | Adhesion force of adhesive paper after hot pressing (N/mm) | Adhesion force of adhesive paper after soaking (N/mm) | Swelling thickness variation of adhesive paper A-B (μm) | Turbidity test D-E | Maximum adhesive overflow width (mm) | Passes/ drop tests | Tab welding tensile force (N) | Hot test: thickness swelling rate for storage at 85° C. for 24 h (%) |
|---|---|---|---|---|---|---|---|---|---|---|---|
| Example 1-1 | Polyethylene | 60 | 0.8230 | 0.54 | 0.35 | 1.2 | 101 C | 0.24 | 10/10 | 45.51 | 23.84 |
| Example 1-2 | Polypropylene | 60 | 0.8248 | 0.55 | 0.38 | 1.3 | 107 C | 0.16 | 10/10 | 46.72 | 22.65 |
| Example 1-3 | Polyethylene + polyetryne | 30 + 30 | 0.8234 | 0.51 | 0.32 | 1.1 | 120 C | 0.37 | 10/10 | 45.27 | 22.72 |
| Example 1-4 | Maleic anhydride modified polyethylene | 60 | 0.8312 | 0.57 | 0.37 | 1.2 | 101 C | 0.17 | 10/10 | 45.21 | 24.04 |
| Example 1-5 | Maleic anhydride modified polypropylene | 60 | 0.8291 | 0.49 | 0.33 | 1.3 | 101 C | 0.19 | 10/10 | 47.12 | 23.28 |

TABLE 1-continued

| | Component 1 of adhesive layer | Mass percentage of component 1 of adhesive layer (%) | Oxidation peak intensity Y ×10⁻⁷ (A) | Adhesion force of adhesive paper after hot pressing (N/mm) | Adhesion force of adhesive paper after soaking (N/mm) | Swelling thickness variation of adhesive paper A-B (μm) | Turbidity test D-E | Maximum adhesive overflow width (mm) | Passes/drop tests | Tab welding tensile force (N) | Hot test: thickness swelling rate for storage at 85° C. for 24 h (%) |
|---|---|---|---|---|---|---|---|---|---|---|---|
| Example 1-6 | Polyethylene + maleic anhydride modified polyethylene | 30 + 30 | 0.8274 | 0.56 | 0.35 | 1.2 | 101 C | 0.22 | 10/10 | 45.32 | 22.75 |
| Example 1-7 | Polyethylene + polypropylene + maleic anhydride modified polyethylene + maleic anhydride modified polypropylene | 15 + 15 + 15 + 15 | 0.8355 | 0.50 | 0.38 | 1.0 | 107 C | 0.36 | 10/10 | 45.34 | 21.45 |
| Comparative example 1-1 | Polyacrylate | 60 | 4532.4 | 0.19 | 0.04 | 3.8 | 1545 C | 1.57 | 2/10 | 31.49 | 28.56 |

TABLE 2

| | Component 1 of adhesive layer | Weight-average molecular weight of component 1 of adhesive layer | Oxidation peak intensity Y ×10⁻⁷ (A) | Adhesion force of adhesive paper after hot pressing (N/mm) | Adhesion force of adhesive paper after soaking (N/mm) | Swelling thickness variation of adhesive paper A-B (μm) | Turbidity test D-E | Maximum adhesive overflow width (mm) | Passes/drop tests | Tab welding tensile force (N) | Hot test: thickness swelling rate for storage at 85° C. for 24 h (%) |
|---|---|---|---|---|---|---|---|---|---|---|---|
| Example 1-2 | Polypropylene | 225000 | 0.8248 | 0.55 | 0.38 | 1.3 | 107 C | 0.16 | 10/10 | 46.72 | 22.65 |
| Example 2-1 | Polypropylene | 30000 | 0.8969 | 0.37 | 0.14 | 2.8 | 101 C | 0.62 | 5/10 | 41.87 | 24.76 |
| Example 2-2 | Polypropylene | 50000 | 0.8794 | 0.53 | 0.39 | 1.6 | 101 C | 0.53 | 10/10 | 45.75 | 22.49 |
| Example 2-3 | Polypropylene | 100000 | 0.8694 | 0.52 | 0.31 | 1.3 | 107 C | 0.32 | 10/10 | 46.38 | 23.03 |
| Example 2-4 | Polypropylene | 200000 | 0.8466 | 0.54 | 0.35 | 1.2 | 120 C | 0.24 | 10/10 | 47.31 | 23.16 |
| Example 2-5 | Polypropylene | 400000 | 0.8355 | 0.57 | 0.42 | 0.9 | 101 C | 0.09 | 10/10 | 45.62 | 22.77 |
| Example 2-6 | Polypropylene | 500000 | 0.8334 | 0.63 | 0.45 | 0.8 | 101 C | 0.08 | 6/10 | 46.95 | 22.48 |

TABLE 3

| | Component 1 of adhesive layer | Mass percentage of component 1 of adhesive layer (%) | Component 2 of adhesive layer | Mass percentage of component 2 of adhesive layer (%) | Oxidation peak intensity Y ×10⁻⁷ (A) | Adhesion force of adhesive paper after hot pressing (N/mm) | Adhesion force of adhesive paper after soaking (N/mm) |
|---|---|---|---|---|---|---|---|
| Example 1-2 | Polypropylene | 60 | Styrene-ethylene-butethobyrene-styrene block copolymer + petroleum resin | 25 + 5 + 5 + 5 | 0.8248 | 0.55 | 0.38 |

TABLE 3-continued

| | | | | | | | |
|---|---|---|---|---|---|---|---|
| | | | C5 + titanium pink powder + diphenylamine | | | | |
| Example 3-1 | Polypropylene | 40 | Styrene-ethylene-butethobyrene-styrene block copolymer + petroleum resin C5 + titanium pink powder + diphenylamine | 45 + 5 + 5 + 5 | 0.9545 | 0.26 | 0.13 |
| Example 3-2 | Polypropylene | 45 | Styrene-ethylene-butethobyrene-styrene block copolymer + petroleum resin C5 + titanium pink powder + diphenylamine | 40 + 5 + 5 + 5 | 0.9051 | 0.33 | 0.23 |
| Example 3-3 | Polypropylene | 75 | Styrene-ethylene-butethobyrene-styrene block copolymer + petroleum resin C5 + titanium pink powder + diphenylamine | 20 + 3 + 1 + 1 | 0.8181 | 0.52 | 0.37 |
| Example 3-4 | Polypropylene | 85 | Styrene-ethylene-butethobyrene-styrene block copolymer + petroleum resin C5 + titanium pink powder + diphenylamine | 10 + 3 + 1 + 1 | 0.8199 | 0.65 | 0.50 |
| Example 3-5 | Polypropylene | 90 | Styrene-ethylene-butethobyrene-styrene block copolymer + petroleum resin C5 + titanium pink powder + diphenylamine | 5 + 3 + 1 + 1 | 0.8150 | 0.71 | 0.57 |
| Example 3-6 | Polypropylene | 60 | Polyurethane + petroleum resin C5 + titanium pink powder + diphenylamine | 25 + 5 + 5 + 5 | 0.8257 | 0.54 | 0.35 |
| Example 3-7 | Polypropylene | 60 | Polyisobutylene + petroleum resin C5 + titanium pink powder + diphenylamine | 25 + 5 + 5 + 5 | 0.8279 | 0.54 | 0.38 |
| Example 3-8 | Polypropylene | 60 | Polybutadiene + petroleum resin C5 + titanium pink powder + diphenylamine | 25 + 5 + 5 + 5 | 0.8435 | 0.49 | 0.31 |
| Example 3-9 | Polypropylene | 60 | Polyamide + petroleum resin C5 + titanium pink powder + diphenylamine | 25 + 5 + 5 + 5 | 0.8340 | 0.51 | 0.32 |
| Example 3-10 | Polypropylene | 60 | Styrene-ethylene-butethobyrene-styrene block copolymer + petroleum resin C9 + titanium pink powder + diphenylamine | 25 + 5 + 5 + 5 | 0.8226 | 0.52 | 0.34 |
| Example 3-11 | Polypropylene | 60 | Styrene-ethylene-butethobyrene-styrene block copolymer + petroleum resin C5 + petroleum resin C9 + titanium pink powder + diphenylamine | 25 + 2.5 + 2.5 + 5 + 5 | 0.8321 | 0.54 | 0.39 |
| Example 3-12 | Polypropylene | 60 | Styrene-ethylene-butethobyrene-styrene block copolymer + petroleum resin C5 + talc powder + diphenylamine | 25 + 5 + 5 + 5 | 0.8235 | 0.49 | 0.33 |
| Example 3-13 | Polypropylene | 60 | Styrene-ethylene-butethobyrene-styrene block copolymer + petroleum resin C5 + white carbon black + diphenylamine | 25 + 5 + 5 + 5 | 0.8229 | 0.52 | 0.38 |
| Example 3-14 | Polypropylene | 60 | Styrene-ethylene-butethobyrene-styrene block copolymer + petroleum resin C5 + calcium carbonate + diphenylamine | 25 + 5 + 5 + 5 | 0.8217 | 0.47 | 0.36 |
| Example 3-15 | Polypropylene | 60 | Styrene-ethylene-butethobyrene-styrene block copolymer + petroleum resin C5 + titanium pink powder + phosphite triester | 25 + 5 + 5 + 5 | 0.8242 | 0.51 | 0.35 |
| Example 3-16 | Polypropylene | 60 | Styrene-ethylene-butethobyrene-styrene block copolymer + petroleum resin C5 + titanium pink powder + dioctadecylthiodipropionate | 25 + 5 + 5 + 5 | 0.8239 | 0.50 | 0.37 |

TABLE 3-continued

| | Turbidity test D-E | Swelling thickness variation of adhesive paper A-B (μm) | Max-imum adhesive overflow width (mm) | Passes/ drop tests | Tab welding tensile force (N) | Hot test: thickness swelling rate for storage at 85° C. for 24 h (%) |
|---|---|---|---|---|---|---|
| Ex-ample 1-2 | 107 C | 1.3 | 0.16 | 10/10 | 46.72 | 22.65 |
| Ex-ample 3-1 | 120 C | 2.2 | 0.59 | 7/10 | 39.85 | 24.32 |
| Ex-ample 3-2 | 101 C | 1.6 | 0.39 | 9/10 | 40.12 | 24.07 |
| Ex-ample 3-3 | 101 C | 1.2 | 0.13 | 10/10 | 45.53 | 22.45 |
| Ex-ample 3-4 | 107 C | 1.1 | 0.19 | 10/10 | 45.51 | 23.76 |
| Ex-ample 3-5 | 120 C | 1.1 | 0.12 | 8/10 | 49.24 | 23.54 |
| Ex-ample 3-6 | 101 C | 1.2 | 0.24 | 10/10 | 45.65 | 22.43 |
| Ex-ample 3-7 | 101 C | 1.2 | 0.16 | 10/10 | 45.95 | 22.50 |
| Ex-ample 3-8 | 107 C | 1.3 | 0.19 | 10/10 | 46.37 | 22.45 |
| Ex-ample 3-9 | 120 C | 1.1 | 0.21 | 10/10 | 45.75 | 23.26 |
| Ex-ample 3-10 | 101 C | 1.5 | 0.41 | 10/10 | 46.14 | 22.85 |
| Ex-ample 3-11 | 101 C | 1.4 | 0.23 | 10/10 | 46.07 | 23.09 |
| Ex-ample 3-12 | 107 C | 1.3 | 0.30 | 10/10 | 45.81 | 22.94 |
| Ex-ample 3-13 | 120 C | 1.1 | 0.26 | 10/10 | 46.02 | 22.84 |
| Ex-ample 3-14 | 101 C | 1.4 | 0.28 | 10/10 | 45.83 | 23.56 |
| Ex-ample 3-15 | 107 C | 1.2 | 0.21 | 10/10 | 45.29 | 22.54 |
| Ex-ample 3-16 | 120 C | 1.1 | 0.25 | 10/10 | 46.03 | 21.98 |

TABLE 4

| | Thickness of adhesive layer (μm) | Substrate layer material | Thickness of substrate layer (μm) | Thickness of adhesive paper (μm) | Oxidation peak intensity Y ×10$^{-7}$ (A) | Adhesion force of adhesive paper after hot pressing (N/mm) | Adhesion force of adhesive paper after soaking (N/mm) |
|---|---|---|---|---|---|---|---|
| Example 1-2 | 12 | Polyethylene terephthalate | 12 | 254 | 0.8248 | 0.55 | 0.38 |
| Example 4-1 | 2 | Polyethylene terephthalate | 12 | 14 | 0.8277 | 0.25 | 0.16 |
| Example 4-2 | 4 | Polyethylene terephthalate | 12 | 16 | 0.8284 | 0.29 | 0.18 |
| Example 4-3 | 8 | Polyethylene terephthalate | 12 | 20 | 0.8159 | 0.38 | 0.25 |
| Example 4-4 | 20 | Polyethylene terephthalate | 12 | 32 | 0.8256 | 0.55 | 0.41 |
| Example 4-5 | 25 | Polyethylene terephthalate | 12 | 37 | 0.8245 | 0.58 | 0.40 |
| Example 4-6 | 12 | Polyethylene terephthalate | 2 | 14 | 0.8198 | 0.47 | 0.32 |
| Example 4-7 | 12 | Polyethylene terephthalate | 4 | 16 | 0.8316 | 0.50 | 0.34 |
| Example 4-8 | 12 | Polyethylene terephthalate | 25 | 37 | 0.8274 | 0.53 | 0.39 |
| Example 4.9 | 12 | Polyethylene terephthalate | 40 | 52 | 0.8315 | 0.49 | 0.37 |
| Example 4-10 | 12 | Polyethylene terephthalate | 45 | 57 | 0.8264 | 0.46 | 0.35 |
| Example 4-11 | 12 | Polyimide | 12 | 24 | 0.8267 | 0.51 | 0.36 |
| Example 4-12 | 12 | Polypropylene | 12 | 25 | 0.8276 | 0.52 | 0.39 |

| | Swelling thickness variation of adhesive paper A-B (μm) | Turbidity test D-E | Maximum adhesive overflow width (mm) | Passes/drop tests | Tab welding tensile force (N) | Hot test: thickness swelling rate for storage at 85° C. for 24 h (%) |
|---|---|---|---|---|---|---|
| Example 1-2 | 1.3 | 107 C | 0.16 | 10/10 | 46.72 | 22.65 |
| Example 4-1 | 0.8 | 101 C | 0.32 | 6/10 | 40.54 | 21.67 |
| Example 4-2 | 1.0 | 101 C | 0.28 | 8/10 | 41.36 | 21.92 |
| Example 4-3 | 1.2 | 101 C | 0.19 | 9/10 | 42.54 | 22.01 |
| Example 4-4 | 1.5 | 107 C | 0.27 | 10/10 | 46.03 | 23.78 |
| Example 4-5 | 1.8 | 120 C | 0.31 | 10/10 | 45.84 | 23.55 |
| Example 4-6 | 1.2 | 107 C | 0.18 | 7/10 | 45.98 | 22.01 |
| Example 4-7 | 1.0 | 107 C | 0.31 | 8/10 | 45.74 | 21.99 |
| Example 4-8 | 1.3 | 107 C | 0.29 | 10/10 | 45.54 | 22.56 |
| Example 4.9 | 1.1 | 107 C | 0.22 | 10/10 | 46.46 | 22.72 |
| Example 4-10 | 1.2 | 107 C | 0.27 | 10/10 | 46.21 | 22.88 |
| Example 4-11 | 1.6 | 101 C | 0.35 | 10/10 | 45.50 | 22.73 |
| Example 4-12 | 1.4 | 101 C | 0.29 | 10/10 | 45.95 | 22.86 |

Referring to Table 1, as can be seen from Example 1-1 to Example 1-7 and Comparative Example 1-1, when the adhesive layer includes polyolefin and/or modified polyolefin, the adhesion force and electrolyte resistance of the adhesive paper are improved, the maximum adhesive overflow width and the swelling thickness variation of the adhesive paper are reduced, and the safety performance and storage performance of the electrochemical apparatus are also improved.

Referring to Table 2, as can be seen from Example 1-2 and Example 2-1 to Example 2-6, when the weight-average molecular weights of the polyolefin and the modified polyolefin are within the range of this application, the adhesion force of the adhesive paper and the safety performance of the electrochemical apparatus are higher. In addition, the obtained adhesive paper has both good adhesion force and electrolyte resistance, the maximum adhesive overflow width and the swelling thickness variation of the adhesive paper are small, and the electrochemical apparatus has both good safety performance and storage performance.

The mass percentages of the components in the adhesive layer generally affect the performance of the adhesive paper. Referring to Table 3, as can be seen from Example 1-2 and Example 3-1 to Example 3-16, when the mass percentage of the polyolefin and/or modified polyolefin is within the range of this application, the electrolyte resistance of the adhesive paper and the safety performance of the electrochemical apparatus are higher. In addition, the obtained adhesive paper has both good adhesion force and electrolyte resistance, the maximum adhesive overflow width and the swelling thickness variation of the adhesive paper are small, and the electrochemical apparatus has both good safety performance and storage performance.

The thickness of the adhesive layer, the thickness of the substrate layer, and the material type of the substrate layer generally affect the performance of the adhesive paper, which in turn affects the performance of the electrochemical apparatus. Referring to Table 4, as can be seen from Example 1-2 and Example 4-1 to Example 4-5, when the thickness of the adhesive layer is within the range of this application, the obtained adhesive paper has a smaller adhesive overflow width; and as can be seen from Example 1-2 and Example 4-6 to Example 4-12, when the thickness of the substrate layer and the material type of the substrate layer are within the ranges of this application, the obtained adhesive paper has good adhesion force and electrolyte resistance, the maximum adhesive overflow width and swelling thickness variation of the adhesive paper are small, and the electrochemical apparatus has good safety performance and storage performance. As can be seen from Example 1-2 and Example 4-1 to Example 4-12, when the thickness of the adhesive paper, the thickness of the substrate layer, and material type of the substrate layer are within the ranges of this application, the obtained adhesive paper has both good adhesion force and electrolyte resistance, the maximum adhesive overflow width and swelling thickness variation of the adhesive paper are small, and the electrochemical apparatus has both good safety performance and storage performance.

The foregoing descriptions are merely preferred embodiments of this application, but are not intended to limit this application. Any modifications, equivalent replacements, and improvements made without departing from the spirit and principle of this application shall fall within the protection scope of this application.

What is claimed is:

1. An adhesive paper, comprising a substrate layer and an adhesive layer provided on one surface of the substrate layer, the adhesive layer comprising polyolefin and/or modified polyolefin; wherein dissolved substance of the adhesive paper in a lithium salt-free electrolyte, as tested by cyclic voltammetry, shows zero reaction peaks at a scanning voltage of 4.5 V and an oxidation peak intensity less than $1 \times 10^{-7}$ A at a scanning voltage from 3 V to 4.5 V.

2. The adhesive paper according to claim 1, wherein the polyolefin comprises polyethylene and/or polypropylene, and the modified polyolefin comprises maleic anhydride modified polyethylene and/or maleic anhydride modified polypropylene.

3. The adhesive paper according to claim 1, wherein a weight-average molecular weight of the polyolefin and/or the modified polyolefin is 50000 to 400000.

4. The adhesive paper according to claim 1, wherein based on a total mass of the adhesive layer, a mass percentage of the polyolefin and/or the modified polyolefin is 45% to 85%.

5. The adhesive paper according to claim 1, wherein a thickness of the adhesive layer is 4 μm to 20 μm.

6. The adhesive paper according to claim 1, wherein an adhesion force of the adhesive layer is 0.2 N/mm to 1.0 N/mm after hot pressing.

7. The adhesive paper according to claim 1, wherein the lithium salt-free electrolyte comprises a mixed solvent of ethylene carbonate, propylene carbonate, diethyl carbonate, and ethyl propionate at a mass ratio of 3:1:3:3.

8. The adhesive paper according to claim 1, wherein an adhesion force of the adhesive layer is 0.1 N/mm to 1.0 N/mm after soaking in an electrolyte for 4 h at 85° C.

9. The adhesive paper according to claim 1, wherein a thickness A of the adhesive paper after soaking in an electrolyte for 24 h at 85° C. and a thickness B of the adhesive paper without soaking in the electrolyte satisfy: 0 μm<A−B≤2 μm.

10. The adhesive paper according to claim 1, wherein a turbidity D of the electrolyte after the adhesive paper is soaked in an electrolyte for 12 h at 85° C. and a turbidity E of the electrolyte before the soaking satisfy: 100C<D−E≤1535C.

11. The adhesive paper according to claim 1, wherein a maximum adhesive overflow width of the adhesive paper is 0 mm to 1 mm.

12. The adhesive paper according to claim 1, wherein the substrate layer comprises at least one of polyethylene terephthalate, polyimide, or polypropylene, and a thickness of the substrate layer is 4 μm to 40 μm.

13. The adhesive paper according to claim 1, wherein the adhesive paper further comprises a release paper and the release paper is provided on a surface of the adhesive layer facing away from the substrate layer.

14. An electrochemical apparatus, comprising an adhesive paper, the adhesive paper comprises a substrate layer and an adhesive layer provided on one surface of the substrate layer, the adhesive layer comprising polyolefin and/or modified polyolefin; wherein dissolved substance of the adhesive paper in a lithium salt-free electrolyte, as tested by cyclic voltammetry, shows zero reaction peaks at a scanning voltage of 4.5 V and an oxidation peak intensity less than $1 \times 10 - 7$ A at a scanning voltage from 3 V to 4.5 V.

15. The electrochemical apparatus according to claim 14, wherein the polyolefin comprises polyethylene and/or polypropylene, and the modified polyolefin comprises maleic anhydride modified polyethylene and/or maleic anhydride modified polypropylene.

16. The electrochemical apparatus according to claim 14, wherein a weight-average molecular weight of the polyolefin and/or the modified polyolefin is 50000 to 400000.

17. The electrochemical apparatus according to claim 14, wherein based on a total mass of the adhesive layer, a mass percentage of the polyolefin and/or the modified polyolefin is 45% to 85%.

18. The electrochemical apparatus according to claim 14, wherein a thickness of the adhesive layer is 4 μm to 20 μm.

19. The electrochemical apparatus according to claim 14, wherein an adhesion force of the adhesive layer is 0.2 N/mm to 1.0 N/mm after hot pressing.

20. The electrochemical apparatus according to claim 14, further comprising an electrode plate, wherein the electrode plate comprises a tab, and an adhesion force between the adhesive layer in the adhesive paper and the tab or between the adhesive layer in the adhesive paper and the electrode plate is 0.2 N/mm to 1.0 N/mm.

* * * * *